(12) United States Patent
Filsfils et al.

(10) Patent No.: US 8,724,627 B2
(45) Date of Patent: May 13, 2014

(54) SINGLE-HOMING AND ACTIVE-ACTIVE MULTI-HOMING IN A VIRTUAL PRIVATE LAN SERVICE

(75) Inventors: Clarence Filsfils, Brussels (BE); Sami Boutros, San Ramon, CA (US); Samer M Salam, Vancouver (CA); Ali Sajassi, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 222 days.

(21) Appl. No.: 13/031,909

(22) Filed: Feb. 22, 2011

(65) Prior Publication Data

US 2012/0213222 A1     Aug. 23, 2012

(51) Int. Cl.
*H04L 12/28* (2006.01)

(52) U.S. Cl.
USPC ........... 370/390; 370/392; 370/401; 370/255; 370/389; 370/406; 709/239

(58) Field of Classification Search
USPC ................. 370/390, 401, 225, 389, 406, 392; 709/239
See application file for complete search history.

(56) References Cited

U.S. PATENT DOCUMENTS

| | | | |
|---|---|---|---|
| 7,609,672 B2 * | 10/2009 | Retana et al. | 370/328 |
| 7,643,409 B2 | 1/2010 | Voit et al. | |
| 7,697,534 B1 * | 4/2010 | Narayanan et al. | 370/392 |
| 2005/0169270 A1 * | 8/2005 | Mutou et al. | 370/390 |
| 2006/0047851 A1 * | 3/2006 | Voit et al. | 709/239 |

OTHER PUBLICATIONS

Kompella & Rekhter, Virtual Private LAN Service using BGP for auto-discovery and signalling, Network working group, Jan. 2007, all pages.*
"Cisco IOS® MPLS Virtual Private LAN Service (VPLS) Technical Deployment Overview," Cisco Systems, Inc., San Jose, CA (2004), http://www.cisco.com/application/pdf/en/us/guest/tech/tk891/c1482/ccmigration_09186a008011ed3ea.pdf.
Kothari et al., "BGP based Multi-homing in Virtual Private LAN Service," Internet Engineering Task Force, Reston, VA (Oct. 25, 2010), http://tools.ietf.org/html/draft-ietf-l2vpn-vpls-multihoming-02.

* cited by examiner

*Primary Examiner* — Man Phan
*Assistant Examiner* — Mewale Ambaye
(74) *Attorney, Agent, or Firm* — The Law Office of Kirk D. WIlliams

(57) ABSTRACT

In one embodiment, single-homing and active-active multi-homing is provided in a Virtual Private LAN Service (VPLS). A customer edge node actively communicates frames of a same Virtual Private Network (VPN) instance with two or more VPLS nodes of a VPLS network. The VPLS nodes are configured to appropriately forward frames throughout the VPLS network: without looping of a frame sent by the same external node back to the same external node, without flooding multiple copies of a frame to the same external node, and while performing learning of addresses in forwarding tables of said VPLS nodes such that said forwarding tables of said VPLS nodes converge despite frames of the same LAN service being received by said at least two of said VPLS nodes from the same external node.

18 Claims, 6 Drawing Sheets

SINGLE-HOMING AND ACTIVE-ACTIVE MULTI-HOMING IN A VIRTUAL PRIVATE LAN SERVICE

TECHNICAL FIELD

The present disclosure relates generally to communicating information using a Virtual Private LAN Service (VPLS).

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Virtual Private LAN Service (VPLS) is a technology to transport Ethernet services, especially Ethernet Bridged services, typically over a Multiprotocol Label Switching (MPLS) core network. A Service Provider (SP) may give the customer redundant connectivity to one or more sites by what is often called multi-homing active/standby redundancy, whereby a customer device is connected to both an active VPLS node and a standby VPLS node. The customer device communicates frames of a Virtual Private Network (VPN) instance with an active VPLS node, but not the standby VPLS node. In case of failure in communications with the active VPLS node, the customer device ceases communicating frames of the VPN instance with that VPLS node, and begins communicating frames with the previously standby, now active, VPLS node.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
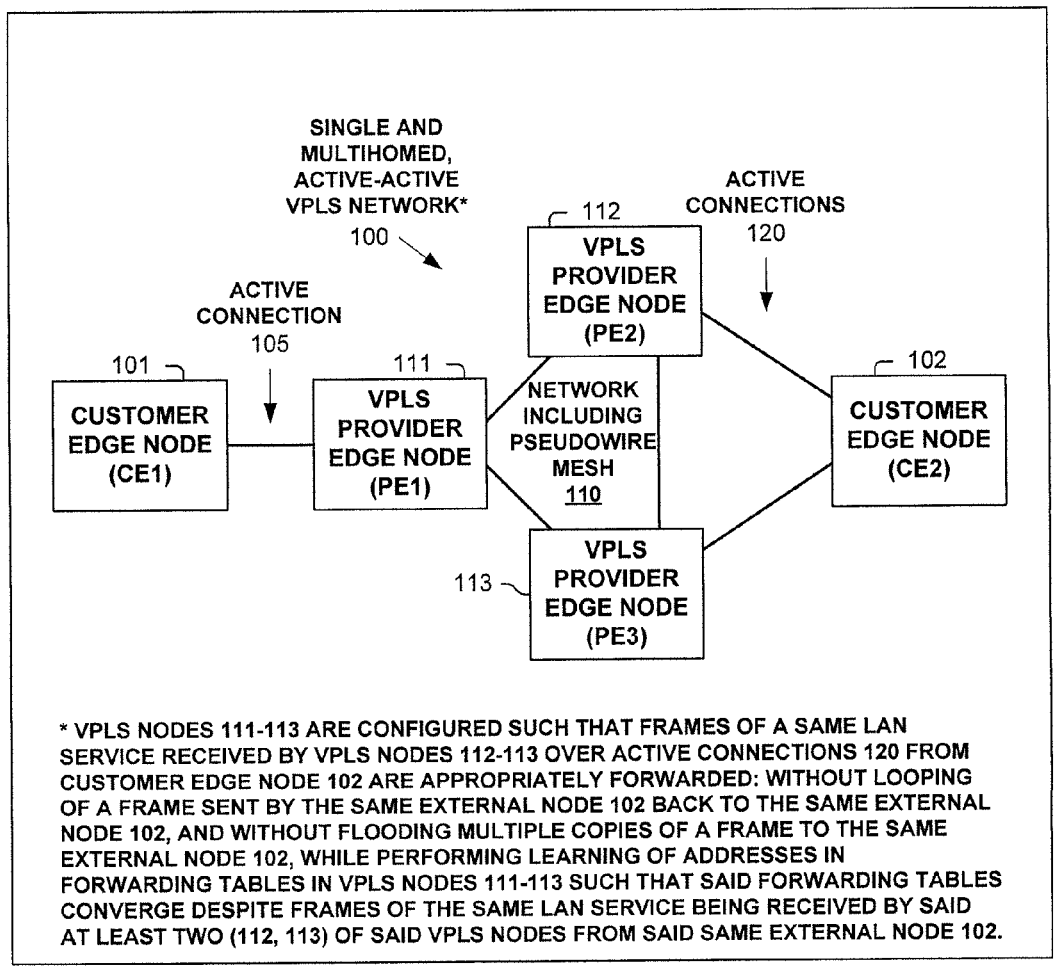
FIG. 1 illustrates a network operating according to one embodiment.

Disclosed are, inter alia, methods, apparatus, computer-storage media, mechanisms, and means associated with single-homing and active-active multi-homing in a Virtual Private LAN Service (VPLS). One embodiment includes a network, which includes: a Virtual Private LAN Service (VPLS) network including three or more interconnected VPLS nodes, with at least two of said VPLS nodes actively communicatively coupled to a same external node for receiving Layer-2 (L2) packets of a same LAN service natively to the VPLS network from the same external node. The VPLS nodes are configured to appropriately forward frames throughout the VPLS network: without looping of a frame sent by the same external node back to the same external node, without flooding multiple copies of a frame to the same external node, and while performing learning of addresses in forwarding tables of said VPLS nodes such that said forwarding tables of said VPLS nodes converge despite frames of the same LAN service being received by said at least two of said VPLS nodes from the same external node.

In one embodiment, a first Virtual Private LAN Service (VPLS) node of a VPLS network receives a first frame from an external node external to the VPLS network. The first VPLS node creates a first Multiprotocol Label Switching (MPLS) packet encapsulating the received first frame, and includes in the label stack of the MPLS packet a MPLS label identifying the external node as the source of the first frame. The first VPLS node sends the first packet to another particular VPLS node of the VPLS network for communicating the first frame to a destination node external to the VPLS network. In one embodiment, the particular VPLS node performs address learning based on the MPLS label identifying the external node as the source of the first frame.

In one embodiment, a first Virtual Private LAN Service (VPLS) node of a VPLS network receives a Multiprotocol Label Switching (MPLS) packet from a second VPLS node of the VPLS network. The MPLS packet includes an encapsulated frame, with the label stack of the MPLS packet including a first MPLS label identifying an external node as the source of the frame. The first VPLS node performs address learning, including learning that the external node is actively coupled to the second VPLS node based on the first MPLS label identifying the external node as the source of the frame. In one embodiment, the label stack of said received first packet includes a second MPLS label identifying the second VPLS node; wherein the second MPLS label is a pseudowire (PW) label or a point-to-multipoint (P2MP) label; and wherein said address learning is based on the first MPLS label identifying the external node as the source of the frame and the second MPLS label identifying the second VPLS node. In one embodiment, the destination of the frame is a multi-homed destination node external to the VPLS network that is actively communicatively coupled to at least the first VPLS node and a second VPLS node of the VPLS network. In one embodiment, in response to communications to the multi-homed destination node being currently unavailable from the first VPLS node, the first VPLS node creates a second MPLS packet and includes in the label stack of the second MPLS packet the first MPLS label as a downstream label; and sends the second MPLS packet to the second node in the VPLS network so that it can send the frame to the multi-homed destination node.

2. Description

Disclosed are, inter alia, methods, apparatus, computer-storage media, mechanisms, and means associated with single-homing and active-active multi-homing in a Virtual Private LAN Service (VPLS). Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Expressly turning to the figures, FIG. 1 illustrates a single-homed, and multi-homed active-active VPLS network 100 operating according to one embodiment. As shown, network 100 includes three VPLS provider edge nodes 111-113 interconnected network 100, typically including a pseudowire mesh network so each of three VPLS provider edge nodes 111-113 are configured for communicating with each other. In one embodiment, each of three VPLS provider edge nodes 111-113 is a root of a point-to-multipoint (P2MP) inclusive or aggregate inclusive tree for sending to each of the other VPLS provider edge nodes 111-113.

Further, as shown in FIG. 1, customer edge node (CE1) 101 is natively communicatively coupled via a single active connection 105 (i.e., is single-homed) to VPLS provider edge node (PE1) 111.

Customer edge node (CE2) 102 is natively communicatively coupled via multiple active connections 120 (i.e., is multi-homed) to VPLS provider edge nodes (PE2 112 and PE3 113). Customer edge node 102 actively sends and receives frames of a same Virtual Private Network (VPN) instance, thus CE2 is active-active multi-homed to VPLS network 100. Prior approaches could not allow active-active multi-homed as it created forwarding issues. Therefore, multi-homed prior approaches in a VPLS network were limited to active-standby, wherein a single active connection to a single PE was used for communicating packets of a same VPN instance.

However, VPLS nodes 111-113 are configured such that frames of a same LAN service received by VPLS nodes 112-113 over active connections 120 from customer edge node 102 are appropriately forwarded: without looping of a frame sent by the same external node 102 back to the same external node 102, and without flooding multiple copies of a frame to the same external node 102, while performing learning of addresses in forwarding tables in VPLS nodes 111-113 such that said forwarding tables converge despite frames of the same LAN service being received by said at least two (112, 113) of said VPLS nodes from said same external node 102. Note, FIGS. 3-6 illustrate aspects of one embodiment that provides active-active multi-homing in a VPLS network for communicating packets of a same VPN instance; and, of course, other embodiments are possible. Note, as used herein, when a reference is made to simply multi-homing or a multi-homed CE device (MH-CE), it is referring to active-active multi-homing or a multi-homed CE device as this is the focus of this disclosure; unless, of course, the passage is discussing a prior approach which would be a reference to active-standby multi-homing.

Figure 2:
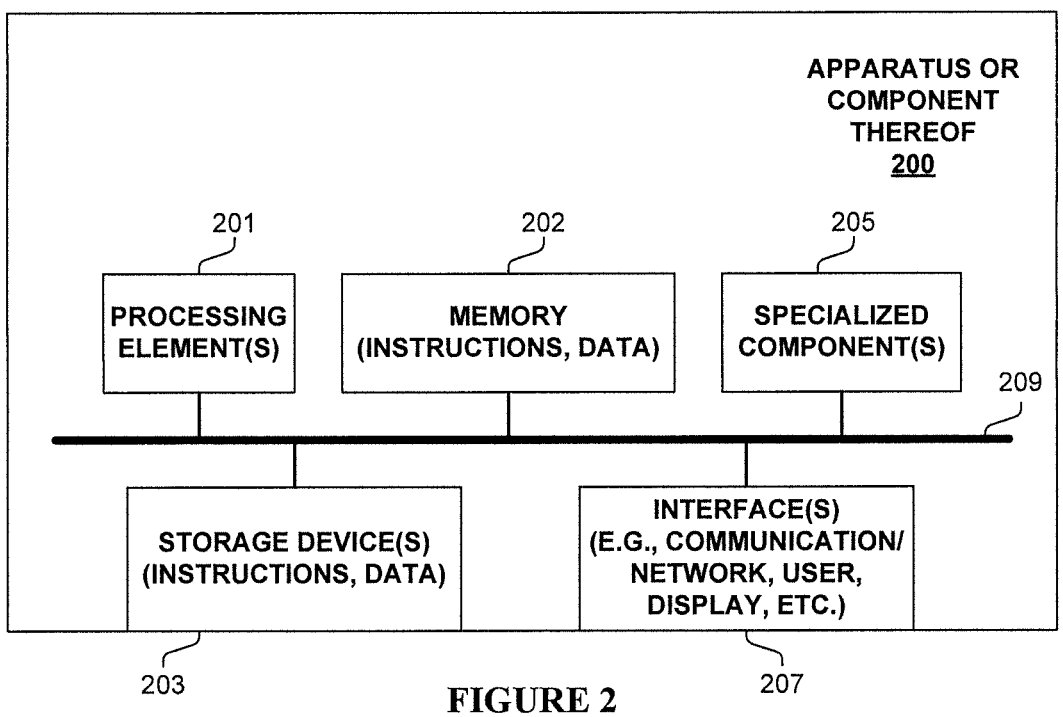
FIG. 2 illustrates an apparatus or component used in one embodiment.

FIG. 2 is block diagram of an apparatus or component 200 used in one embodiment associated with single-homing and active-active multi-homing in a Virtual Private LAN Service (VPLS). In one embodiment, apparatus or component 200 performs one or more processes corresponding to one of the flow diagrams illustrated or otherwise described herein.

In one embodiment, apparatus or component 200 includes one or more processing element(s) 201, memory 202, storage device(s) 203, specialized component(s) 205 (e.g. optimized hardware such as for performing operations, etc.), and interface(s) 207 for communicating information (e.g., sending and receiving packets, user-interfaces, displaying information, etc.), which are typically communicatively coupled via one or more communications mechanisms 209, with the communications paths typically tailored to meet the needs of the application. In one embodiment apparatus or component 200 corresponds to, or is part of, network device 101 of FIG. 1.

Various embodiments of apparatus or component 200 may include more or less elements. The operation of apparatus or component 200 is typically controlled by processing element(s) 201 using memory 202 and storage device(s) 203 to perform one or more tasks or processes. Memory 202 is one type of computer-readable/computer-storage medium, and typically comprises random access memory (RAM), read only memory (ROM), flash memory, integrated circuits, and/or other memory components. Memory 202 typically stores computer-executable instructions to be executed by processing element(s) 201 and/or data which is manipulated by processing element(s) 201 for implementing functionality in accordance with an embodiment. Storage device(s) 203 are another type of computer-readable medium, and typically comprise solid state storage media, disk drives, diskettes, networked services, tape drives, and other storage devices. Storage device(s) 203 typically store computer-executable instructions to be executed by processing element(s) 201 and/or data which is manipulated by processing element(s) 201 for implementing functionality in accordance with an embodiment.

Figure 3:
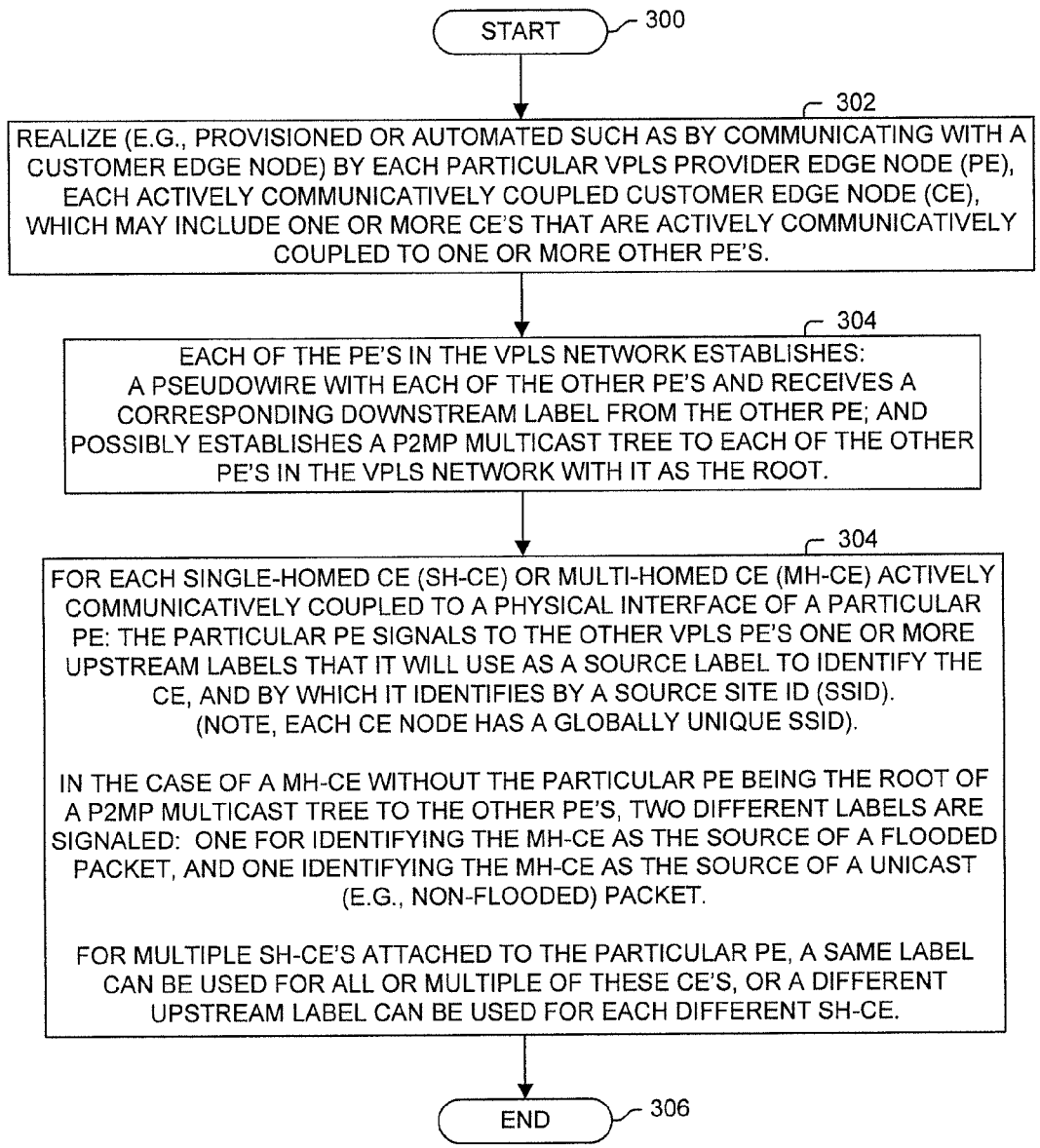
FIG. 3 illustrates a process performed in one embodiment.

FIG. 3 illustrates a process performed in one embodiment. Processing begins with process block 300. In process block 302, each particular VPLS provider edge node (PE) of a VPLS network realizes (e.g., is provisioned, or automated such as by, but not limited to, communicating with a customer edge node) each of its actively communicatively coupled customer edge node (CE), which may include one or more CE's that are actively communicatively coupled to one or more other PE's. In process block 304, each of the PE's in the VPLS network establishes: a pseudowire with each of the other PE's and receives a corresponding downstream label from the other PE; and possibly establishes a P2MP multicast tree to each of the other PE's in the VPLS network with it as the root. A P2MP tree is a convenient mechanism used in one embodiment to flood packets to all of the other PE's; rather than individually sending unicast packets to each of the other PE's.

In process block 306: for each single-homed CE (SH-CE) or active-active multi-homed CE (MH-CE) actively communicatively coupled to a physical interface of a particular PE: the particular PE signals to the other VPLS PE's one or more upstream labels that it will use as a source label to identify the CE, and by which it identifies by a source site id (SSID) globally uniquely identifying the CE node. The SSID allows two different PE's to realize configuration and other information that is related to a same CE. In the case of a MH-CE without the particular PE being the root of a P2MP multicast tree to the other PE's, two different label are signaled: one for identifying the MH-CE as the source of a flooded packet, and one identifying the MH-CE as the source of a unicast (e.g., non-flooded) packet. For multiple SH-CE's attached to the particular PE, a same label can be used for all or multiple of these CE's, or a different upstream label can be used for each different SH-CE.

Processing of the flow diagram of FIG. 3 is complete as indicated by process block 309.

Figure 4:
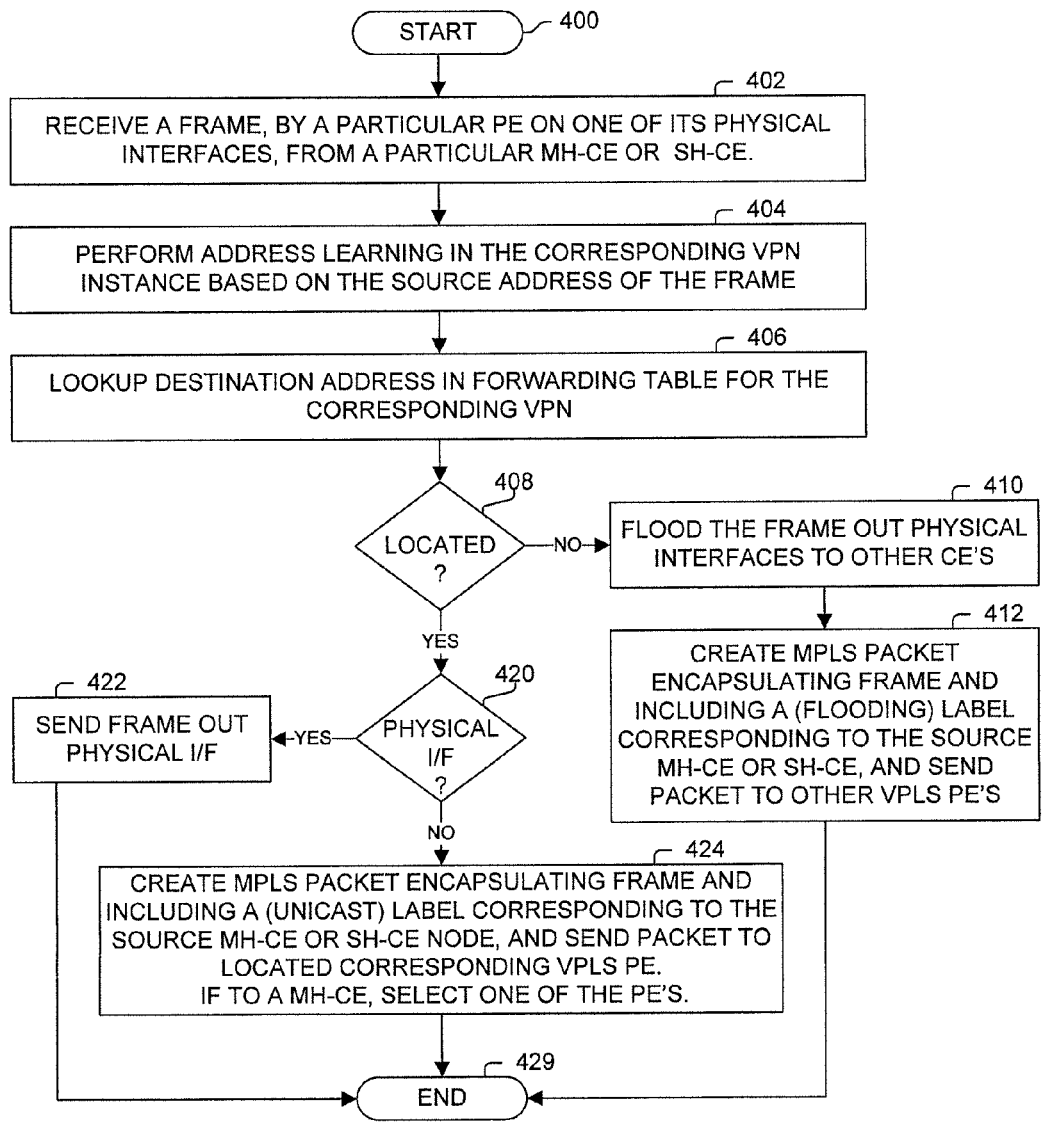
FIG. 4 illustrates a process performed in one embodiment.

FIG. 4 illustrates a process performed in one embodiment by a provider edge node (PE). Processing begins with process block 400. In process block 402, a frame is received by a particular PE on one of its physical interfaces from a particular MH-CE or SH-CE. Note, the term physical interface is used to distinguish between interfaces to CE devices, and interfaces to the VPLS network. In process block 404, address learning is performed in the corresponding VPN instance based on the source address of the received frame. In process block 406, a lookup operation is performed in a forwarding table for the VPN instance based on the destination address of the received frame.

As determined in process block 408, if a forwarding entry is not found, then in process block 410 the frame is forwarded out all other physical interfaces to all other attached CE devices (and not to the CE that sent the frame). In process block 412, a MPLS packet is created which encapsulates the received frame and includes a label corresponding to the source MH-CE or SH-CE. In one embodiment, in forwarding a frame received from a MH-CE, the "flooding" label for the MH-CE is used (which is different than the unicast label for the MH-CE). This allows a receiving PE to know that the packet was flooded in the VPLS network when the transmission method (e.g., multiple copies of the packet communicated over individual pseudowires) does not provide such notice (wherein a communication via P2MP provides such distinction between a unicasted packet). The packet is sent to all of the other VPLS PE's, typically either over individual pseudowires or via a P2MP tree.

Otherwise, destination forwarding information was located in process block 406 as determined in process block 408. In which case, in process block 420, a determination is made whether the CE is coupled to a physical interface (e.g., locally attached instead of remote over the VPLS network). If so, in process block 422, the frame is forwarded out the corresponding physical interface to the destination CE. Otherwise, in process block 424, a MPLS packet is created which encapsulates the received frame and includes a label corresponding to the source MH-CE or SH-CE. In one embodiment, in forwarding a frame received from a MH-CE, the "unicast" label for the MH-CE is used (which is different than the flooding label for the MH-CE). This allows a receiving PE to know that the packet was unicasted in the VPLS network when the transmission method for flooding packets (e.g., multiple copies of the packet communicated over individual pseudowires) does not provide such notice (wherein a communication via P2MP provides such distinction between a unicasted packet). If the destination is to a MH-CE, the PE selects (e.g., via load balancing, hashing, random, rate control influenced) one of the VPLS PE's that is actively coupled to the MH-CE. The packet is then sent to a single other PE in the VPLS network.

Processing of the flow diagram of FIG. 4 is complete as indicated by process block 429.

Figure 5:
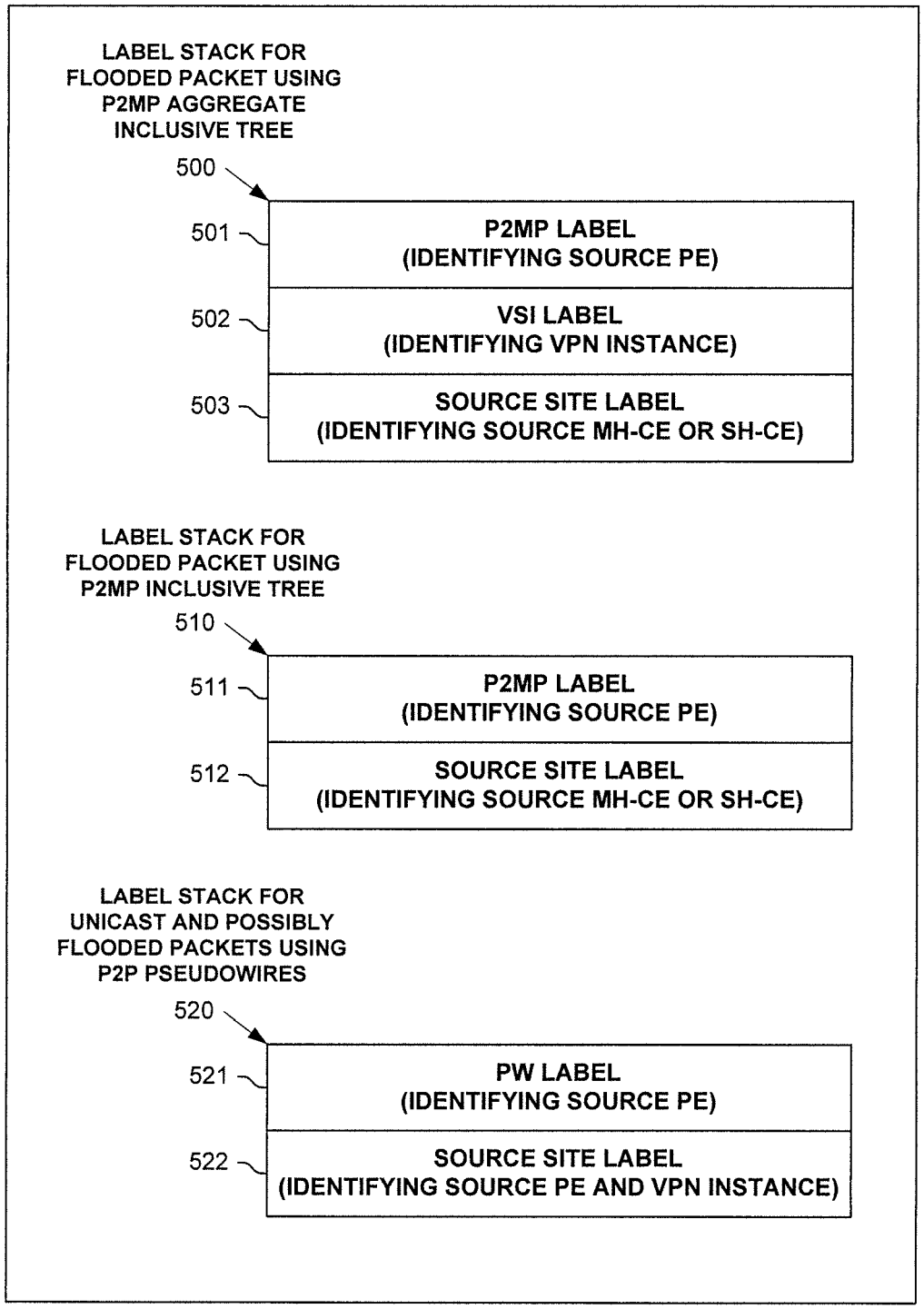
FIG. 5 illustrates examples of label stacks used in one embodiment.

FIG. 5 illustrates examples of label stacks used in sending packets between or among PEs in a VPLS network of one embodiment.

First, label stack 500 is used in one embodiment that employs a P2MP aggregate inclusive tree for flooding packets to the other VPLS nodes. As shown, label stack 500 includes: a P2MP label 501 (which identifies the source PE); a VSI label 502 (which identifies the VPN instance as the P2MP aggregate inclusive tree can be used to communicate packets of other VPN instances); and source site label 503 (identifying the source MH-CE or SH-CE of the frame encapsulated in the packet).

Next, label stack 510 is used in one embodiment that employs a P2MP inclusive tree for flooding packets of a single VPN instance to the other VPLS nodes. As shown, label stack 510 includes: a P2MP label 511 (which identifies the source PE); and source site label 512 (identifying the source MH-CE or SH-CE of the frame encapsulated in the packet).

Finally, label stack 520 is used in one embodiment that employs pseudowires for unicasting packets and possibly flooding packets to another VPLS node(s). As shown, label stack 520 includes: a PW label 521 (which identifies the source PE and VPN instance); and a source site label 522 (identifying the source MH-CE or SH-CE of the frame encapsulated in the packet).

Figure 6:
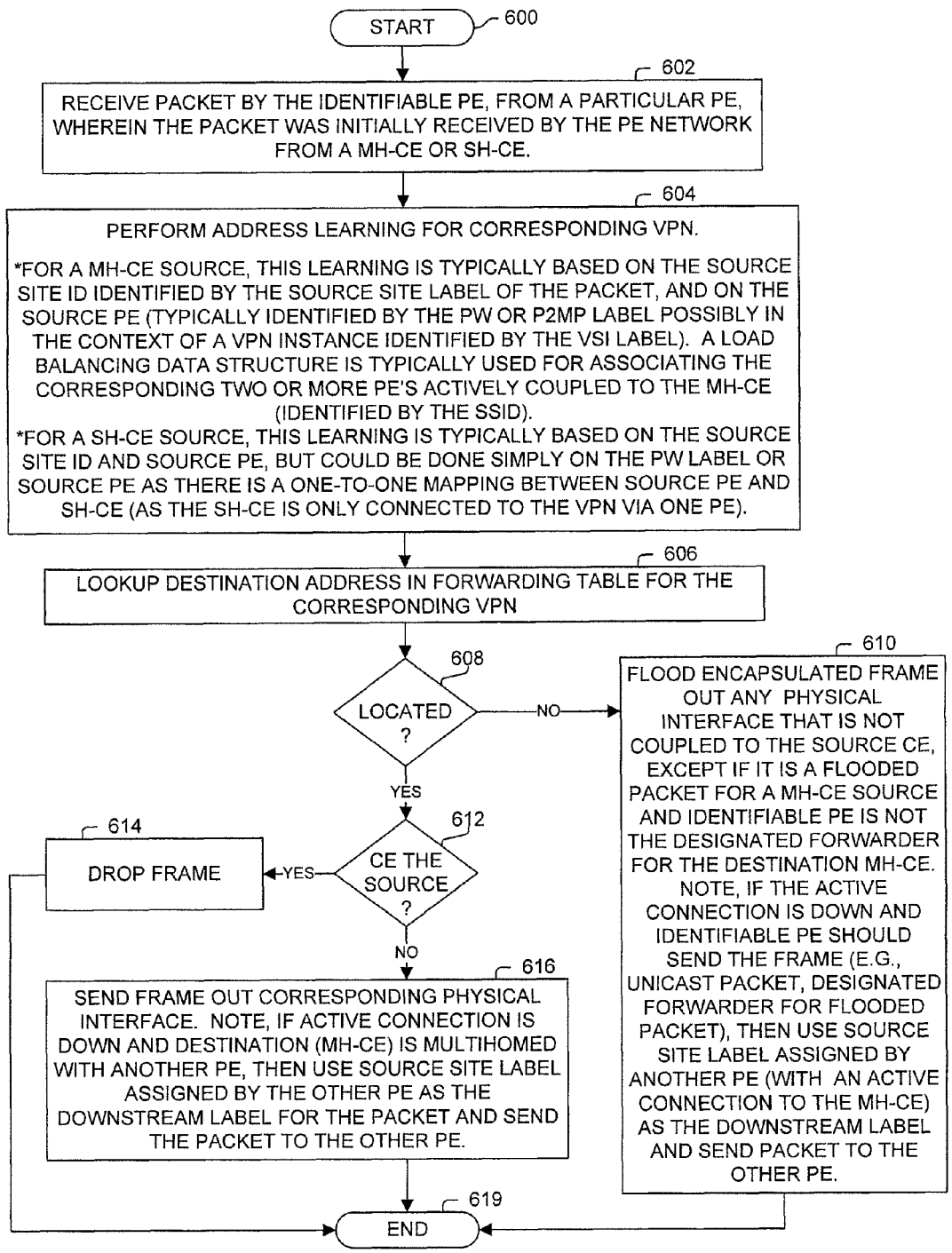
FIG. 6 illustrates a process performed in one embodiment.

FIG. 6 illustrates a process performed in one embodiment by a provider edge node (PE). Processing begins with process block 600. In process block 602, a packet encapsulating a frame and including a label stack is received by a PE from another PE which received the frame from a MH-CE or SH-CE.

In process block 604, address learning is performed for the corresponding VPN.

For a MH-CE source, this learning is typically based on the source site label included in a label stack of the received packet, with the source site label used to identify the source site ID of the sending MH-CE. This learning is further in the context of the sending PE (e.g., identified by the PW or P2MP label), as the PE is learning how to reach the MH-CE through multiple PE's in the VPN. Thus, this learning is typically against the source CE of the encapsulated frame and sending PE, in contrast to simply learning against the sending PE or pseudowire label associated with the sending PE. A load balancing data structure is used in one embodiment for associating the corresponding two or more PE's actively coupled to the sending MH-CE with the source site ID. This mechanism allows learning data structures to converge, instead of having to update to reflect a different path to the MH-CE every time a different PE communicates a frame from a MH-CE.

For a SH-CE source in one embodiment, this learning is done based on the source site ID (e.g., identified by the source site label) and sending PE (e.g., identified by the PW or P2MP label possibly in the VPN context identified by the VSI label). However, for example in one embodiment, this learning is based solely on a pseudowire or sending PE, as there is a one-to-one mapping between source PE and the SH-CE (as the SH-CE is only connected to the VPN via one PE).

In process block 606, the destination address of the encapsulated frame is looked up in a forwarding table of the corresponding VPN. As determined in process block 608, if a forwarding entry is not located, then processing proceeds to process block 610 to flood the frame out any physical interface (e.g., to a directly connected CE) that is not the source CE, except that if it is a flooded packet for a MH-CE source and this PE is not the designated forwarder (i.e., one of the PE's actively coupled to a MH-CE) for the destination MH-CE.

A potential forwarding loop is eliminated by checking to ensure that the frame is not sent to the originator of the frame.

Also, duplicate flooded packets are not sent to a MH-CE by allowing only one of the PE's to send flooded packets to the MH-CE, with this one PE referred to as a designated forwarder. The identification of which PE is a designated forwarder can be configured or automatically determined by the PE's via a host of techniques. Also note that one embodiment uses different pseudowire labels to distinguish between flooded and unicasted packets for at least this designated forwarder of flooded packets purpose.

Further, for fast convergence in one embodiment, when the previously active connection to a CE is currently unavailable and the PE would otherwise send the packet to a MH-CE, then the PE uses the source site label, assigned by another PE viewed as actively coupled to the MH-CE, as a downstream label in the label stack of an MPLS packet, and sends the MPLS packet encapsulating the frame to the other PE.

Otherwise, as determined in process block 608, the forwarding information based on the destination address of the frame was located in process block 606. As determined in process block 612, if the destination CE is the source of the frame, then the frame is dropped (which eliminates a potential forwarding loop by ensuring that the frame is not sent to the originator of the frame). Otherwise, in process block 616, the frame is sent out the corresponding physical interface to a directly coupled CE. Note, as with the fast convergence done in process block 610, in one embodiment, when the previously active connection to a CE is currently unavailable and the PE would otherwise send the packet to a MH-CE, then the PE uses the source site label of another PE, viewed as actively coupled to the MH-CE, as a downstream label in the label stack of a MPLS packet, and sends the MPLS packet encapsulating the frame to the other PE. Note, for a multicast frame, process blocks 612 and process blocks 616 and/or 614 may be repeated for each destination.

Processing of the flow diagram of FIG. 6 is complete as indicated by process block 619.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A network, comprising: a Virtual Private LAN Service (VPLS) network, including three or more interconnected VPLS nodes, with at least two of said VPLS nodes active-active multi-homed to a same external node for receiving Layer-2 (L2) packets of a same LAN service natively to the VPLS network from the same external node; where said VPLS nodes are configured to appropriately forward frames throughout the VPLS network: without looping of a frame sent by the same external node back to the same external node, and without flooding multiple copies of a frame to the same external node, while performing learning of addresses in forwarding tables of said VPLS nodes such that said forwarding tables of said VPLS nodes converge despite frames of a same VPLS instance of the same LAN service being contemporaneously received by said at least two of said VPLS nodes, encapsulated in a Multiprotocol Label Switching (MPLS) packets including in the label stack of the MPLS packets a MPLS label identifying the external node as the source of correspondingly received frames by said at least two of said VPLS nodes from the same external node, and the MPLS packets being correspondingly forwarded within the VPLS network by said at least two of said VPLS nodes.

2. The network of claim 1, wherein said VPLS nodes includes a particular VPLS node and said at least two of said VPLS nodes; and wherein prevention of said flooding multiple copies of an identifiable frame to the same external node includes: the particular VPLS node communicating to said at least two of said VPLS nodes an identifiable packet encapsulating the identifiable frame, with said communication identifying that the identifiable frame is being flooded through the VPLS network; wherein only a single one of said at least two of said VPLS nodes is configured to forward the identifiable frame to the same external node in response to said identification that the identifiable frame is being flooded through the VPLS network.

3. The network of claim 2, wherein said communication identifying that the identifiable frame is being flooded through the VPLS network comprises the identifiable packet including a flooding Multiprotocol Label Switching (MPLS) label representing that the identifiable frame is being flooded through the VPLS network.

4. The network of claim 3, wherein the flooding MPLS label is a source site label identifying the same external node as the source of the identifiable frame.

5. The network of claim 3, wherein the particular VPLS node is configured to distinguish between sending flooding and unicast packets to said at least two of said VPLS nodes by using different source site labels identifying the same external node, with the flooding MPLS label identifying that the identifiable frame is being flooded through the VPLS network, and a second MPLS label identifying that the identifiable frame is being sent to a single one of said at least two of said VPLS nodes.

6. The network of claim 2, wherein said learning of addresses in forwarding tables includes: the particular VPLS node source address learning of first packets, received from said at least two of said VPLS nodes, corresponding to frames received from the same external node based on a multi-homed source identifier directly or indirectly represented in said received first packets, with the multi-homed source identifier referring to the same external node, and associating the multi-homed source identifier with each of said at least two of said VPLS nodes such that the particular node learns that it can send a particular frame to the same external node by sending a packet encapsulating the particular frame to either of said at least two of said VPLS nodes.

7. The network of claim 6, wherein the multi-homed source identifier is a source site value represented in a Multiprotocol Label Switching (MPLS) label included in said first packets.

8. The network of claim 7, wherein said communication identifying that the identifiable frame is being flooded through the VPLS network comprises the identifiable packet including a flooding Multiprotocol Label Switching (MPLS) label representing that the identifiable frame is being flooded through the VPLS network; wherein the flooding MPLS label is a source site label identifying the same external node as the source of the identifiable frame.

9. The network of claim 8, wherein prevention of said looping of a particular frame includes: verifying, by a VPLS node of said at least two of said VPLS nodes, that the source of the particular frame is not the same external node before the VPLS node sends the particular frame to the same external node.

10. The network of claim 1, wherein prevention of said looping of a particular frame includes: verifying, by a VPLS node of said at least two of said VPLS nodes, that the source of the particular frame is not the same external node before the VPLS node sends the particular frame to the same external node.

11. The network of claim 1, wherein said VPLS nodes includes particular VPLS node and said at least two of said VPLS nodes; and wherein said learning of addresses in forwarding tables includes: the particular VPLS node source address learning of first packets, received from said at least two of said VPLS nodes, corresponding to frames received from the same external node based on a multi-homed source identifier directly or indirectly represented in said received first packets, with the multi-homed source identifier referring to the same external node, and associating the multi-homed source identifier with each of said at least two of said VPLS nodes such that the particular node learns that it can send a particular frame to the same external node by sending a packet encapsulating the particular frame to either of said at least two of said VPLS nodes.

12. The network of claim 11, wherein the multi-homed source identifier is a source site value represented in a Multiprotocol Label Switching (MPLS) label included in said first packets.

13. A method, comprising: receiving, by a first Virtual Private LAN Service (VPLS) node of a VPLS network from an external node external to the VPLS network, a first frame of a same VPLS instance of a same LAN service; selecting, based on learned forwarding information including an identification of a plurality of VPLS nodes active-active multi-homed to a destination node, to forward a first Multiprotocol Label Switching (MPLS) packet to a particular VPLS node of the plurality of VPLS nodes active-active multi-homed to the destination node, with each of the plurality of VPLS nodes active-active multi-homed to the destination node both contemporaneously communicating packet traffic of the same VPLS instance of the same LAN service with other nodes in the VPLS network and communicating packet traffic of the same VPLS instance of the same LAN service with the destination node; creating, by the first VPLS node, the first MPLS packet encapsulating said received first frame, and including in the label stack of the MPLS packet a MPLS label identifying the external node as the source of the first frame; and sending, by the first VPLS node, the first MPLS packet to the particular VPLS node of the VPLS network for communicating the first frame to a destination node external to the VPLS network.

14. The method of claim 13, comprising: address learning, by the first VPLS node, based on the MPLS label identifying the external node as the source of the first frame.

15. The method of claim 13, comprising: receiving, by the first VPLS node from the external node, a second frame; creating, by the first VPLS node, a second packet encapsulating said received second frame and including the MPLS label identifying the external node as the source of the second frame; and flooding, by the first VPLS node, the second packet to a plurality of other VPLS nodes of the VPLS network for communicating the second frame to a particular destination node external to the VPLS network.

16. A method, comprising: receiving, by a first Virtual Private LAN Service (VPLS) node of a VPLS network from a second VPLS node of the VPLS network, a Multiprotocol Label Switching (MPLS) packet created by the second VPLS node encapsulating a frame of a same VPLS instance of a same LAN service, and including in its label stack a first MPLS label identifying an external node as the source of the frame having been received by the second VPLS node from the external node; and address learning, by the first VPLS node, that the external node is actively coupled to the second VPLS node based on the first MPLS label identifying the external node as the source of the frame; wherein the external node is an active-active multi-homed node external to the VPLS network that is contemporaneously communicating packets of the same VPLS instance of the same LAN service with at least the first VPLS node and the second VPLS node, and with each of the first and second VPLS nodes contemporaneously communicating packets of the same VPLS instance of the same VLAN service with nodes in the VPLS network.

17. The method of claim 16, wherein the label stack of said received first packet includes a second MPLS label identifying the second VPLS node; wherein the second MPLS label is a pseudo wire (PW) label or a point-to-multipoint (P2MP) label; and wherein said address learning is based on the first MPLS label identifying the external node as the source of the frame and the second MPLS label identifying the second VPLS node.

18. The method of claim 16, comprising: receiving, by the first VPLS node from another VPLS node of the VPLS network, a third MPLS packet encapsulating a frame with a destination address corresponding to the external node; and in response to active communications to the external node being currently unavailable from the first VPLS node, the first VPLS node creating a third MPLS packet which includes in its label stack the first MPLS label as a downstream label; and sending the third MPLS packet to the second VPLS node for sending the frame to the external node.

* * * * *

UNITED STATES PATENT AND TRADEMARK OFFICE
CERTIFICATE OF CORRECTION

| | | |
|---|---|---|
| PATENT NO. | : 8,724,627 B2 | Page 1 of 1 |
| APPLICATION NO. | : 13/031909 | |
| DATED | : May 13, 2014 | |
| INVENTOR(S) | : Filsfils et al. | |

It is certified that error appears in the above-identified patent and that said Letters Patent is hereby corrected as shown below:

In The Claims

Col. 9, Claim 11, line 2, replace "includes particular" with -- includes a particular --

Col. 10, Claim 17, line 4, replace "pseudo wire" with -- pseudowire --

Signed and Sealed this
Twentieth Day of January, 2015

Michelle K. Lee
*Deputy Director of the United States Patent and Trademark Office*